June 3, 1941.   D. G. MERRILL   2,244,113
LEHR AND METHOD OF TREATING GLASSWARE THEREIN
Filed May 6, 1938   8 Sheets-Sheet 1

June 3, 1941.  D. G. MERRILL  2,244,113
LEHR AND METHOD OF TREATING GLASSWARE THEREIN
Filed May 6, 1938  8 Sheets-Sheet 2

Inventor:
Donald G. Merrill
by Brown & Parham
Attorneys

Witness:
W. B. Thayer.

June 3, 1941.   D. G. MERRILL   2,244,113
LEHR AND METHOD OF TREATING GLASSWARE THEREIN
Filed May 6, 1938   8 Sheets-Sheet 3

Inventor:
Donald G. Merrill
by Brown & Parham
Attorneys

June 3, 1941.  D. G. MERRILL  2,244,113
LEHR AND METHOD OF TREATING GLASSWARE THEREIN
Filed May 6, 1938  8 Sheets-Sheet 5

June 3, 1941.                D. G. MERRILL                2,244,113
              LEHR AND METHOD OF TREATING GLASSWARE THEREIN
                    Filed May 6, 1938          8 Sheets-Sheet 6

June 3, 1941.  D. G. MERRILL  2,244,113
LEHR AND METHOD OF TREATING GLASSWARE THEREIN
Filed May 6, 1938   8 Sheets-Sheet 8

Patented June 3, 1941

2,244,113

UNITED STATES PATENT OFFICE 2,244,113

LEHR AND METHOD OF TREATING GLASS-
WARE THEREIN

Donald G. Merrill, West Hartford, Conn., assignor
to Hartford-Empire Company, Hartford, Conn.,
a corporation of Delaware Application May 6, 1938, Serial No. 206,344

31 Claims. (Cl. 49—47)

The present invention relates to lehrs for glassware, particularly to so-called "decorating" lehrs, for first fusing or maturing a ceramic decoration on the glassware and thereafter re-annealing the ware.

Among the objects of the invention is to provide a decorating lehr in which the temperature controlling means set up positive circulations within the tunnel as, for example, by the use of pressure burners and/or air nozzles which introduce heating and/or cooling gases directly into the tunnel, and by their injective action recirculate these gases, so that they pass a plurality of times through the conveyor of the lehr close to and against the glassware in the lehr.

A further object is to provide such a lehr with means for removing a portion of the tunnel gases and the products of combustion adjacent the entrance end of said lehr, and for creating a general drift in the tunnel toward the ware entering end thereof.

A further object is to provide in such a lehr a preheating zone in which circulation set up by the burners is accelerated and augmented by other means.

A further object is to provide a highly oxidizing atmosphere in the heated portion of the lehr, whereby to preclude impairment of the appearance of the decoration on the ware.

Still another object of the invention is to provide in such a lehr a decoration fusing or maturing zone in which heating means above and below the conveyor serve to bring the glassware rapidly to the maturing or decorating fusing temperature through the utilization of the gases of combustion to heat the same through radiation and convection.

Still another object of the invention is to provide in such a lehr means for rapidly reducing the temperature of the glass from the high temperature required for fusing or maturing the decoration to the upper annealing temperature.

Other objects will be apparent from the following description and the accompanying drawings, in which

Figs. 2A, 3A and 4A inclusive are horizontal sections taken on the lines 2A—2A, 3A—3A, and 4A—4A of Figs. 2, 3 and 4, respectively.

Figure 1:
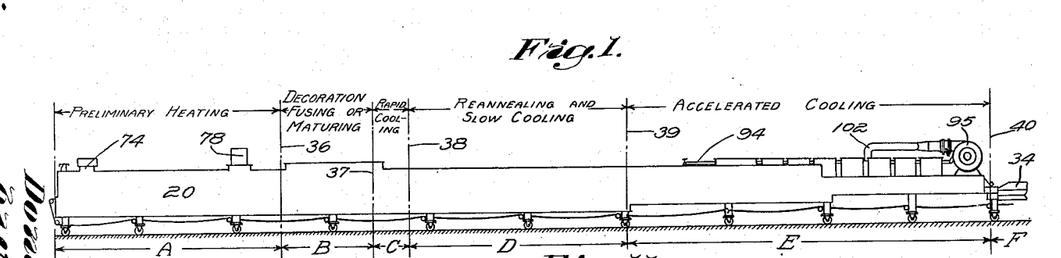
Figure 1 is a diagrammatic side view of a lehr embodying my invention, indicating generally the zones of the lehr tunnel designed for the several stages of treatment of the glassware.

A lehr embodying the invention comprises an elongate tunnel generally designated 20, shown diagrammatically in Fig. 1 and also shown on a larger scale and in detail in Figs. 2 to 7, inclusive, when these views are considered together in consecutive order.

The tunnel may be constructed with inner walls of different materials at different places along the length of the tunnel. In general, the parts forming the inner walls of the tunnel are refractory throughout that portion which is heated or in which the temperature is relatively high while the cooler remaining portion of the tunnel may have the inner walls thereof formed of metallic plates. As shown in the sectional views, the tunnel 20 has an inner bottom wall 21, an inner top wall or ceiling 22, and inner substantially vertical side walls 23.

The inner wall members are backed at the places desired with suitable insulation, such as the insulating material designated at 24. Also suitable refractory or masonry members, such as indicated at 25, may be employed back of the inner wall members at appropriate places to cooperate with the insulation or to act alone as a means for supporting and spacing the tunnel inner wall members from an outer metallic shell or casing 26 which surrounds and maintains the components of the tunnel walls in place.

The tunnel structure, thus composed, is supported by a suitable frame, including cross channel members 27 which are supported on legs 28. Wheels 29 may be provided at the lower ends of these legs for movably supporting the lehr. Preferably the tunnel structure and the means for supporting it are of such a character that the lehr tunnel will have a slight downward slope from its front or ware-entering end to its rear or exit end.

The manner of constructing the walls of the lehr tunnel and the manner of supporting the same, as shown in the drawings of the present application, are substantially the same as shown and described in greater detail in my copending application, Serial No. 66,611, filed March 2, 1936, for Method of and apparatus for annealing glassware, of which the present application is a continuation in part. Specific novel features of construction of the present lehr, which are not disclosed in my aforesaid copending application, Serial No. 66,611, will hereinafter be pointed out and described in detail.

The lehr includes an endless conveyor of open-work construction, such as woven wire fabric, for transporting glassware through the lehr tunnel. The upper reach 30 of this endless conveyor passes completely through the lehr tunnel longitudinally thereof, and is supported therein in spaced relation with the bottom of the tunnel by a suitable supporting metallic frame which includes the flanges of the transverse angle bars 31, Figs. 2, 3 and 4, and a part of Fig. 5, the upper flanges of the transverse channel bars 32, part of Fig. 5 and Figs. 6 and 7, and the Z bars 33, Figs. 8, 9 and 10. This conveyor supporting and guiding frame structure may be supported on the bottom of the tunnel by refractory blocks, as shown in Fig. 8, in the portion of the tunnel in which the inner bottom members are refractory.

Figure 6:
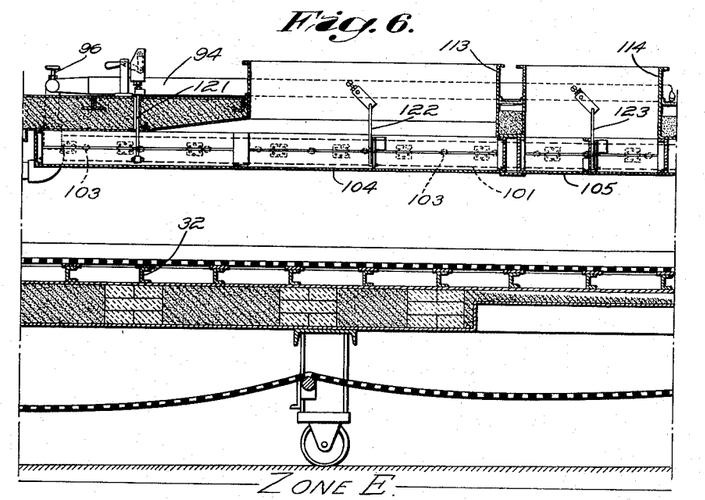
Figure 7:
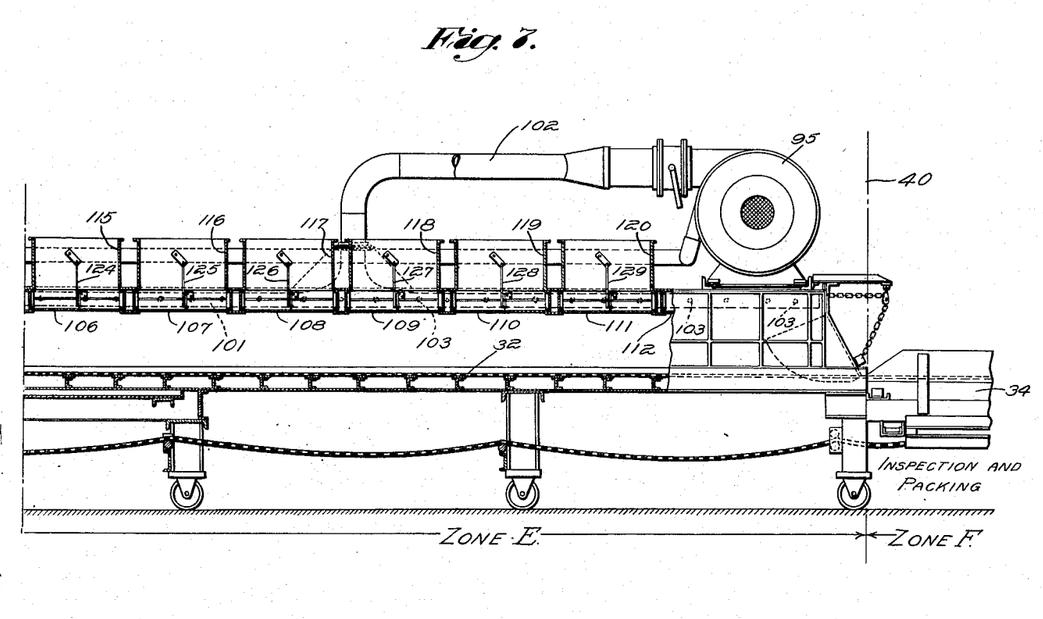
Figure 8:
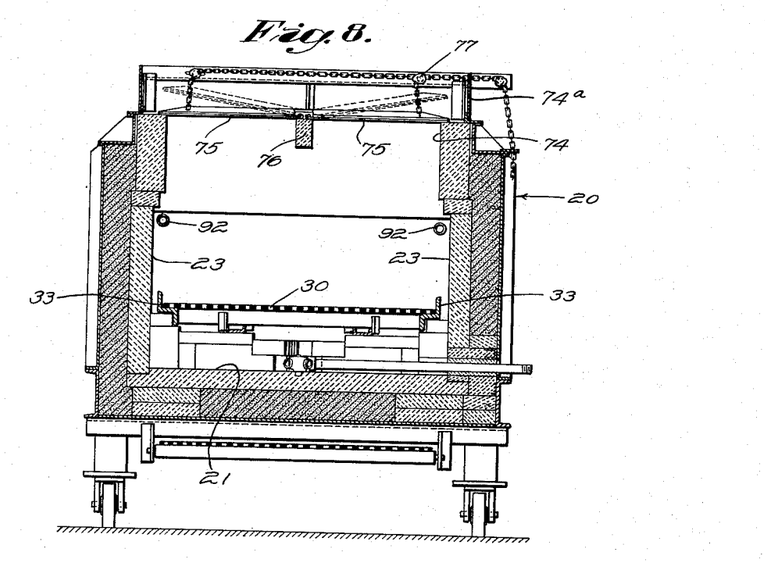
Fig. 8 is a vertical section taken on the line 8—8 of Fig. 2.

After leaving the lehr tunnel, the upper reach of the conveyor passes over a ware-packing and inspection table, partially shown at 34 in Figs. 1 and 7, at the outer end of which is located a suitable conveyor supporting and driving mechanism, (not shown). The direction of the conveyor is changed by this supporting and driving mechanism and the return or idle reach of the conveyor, indicated at 35, is disposed beneath the tunnel structure, being supported and guided at intervals by suitable supporting and guiding devices, such as those shown in Figs. 2 to 7 inclusive. At the front of the lehr, the conveyor passes into the tunnel as shown.

Since the particular conveyor and its supporting and operating mechanisms do not per se form part of the invention to which the claims of the present application are to be directed, further description thereof is not required herein. The particular conveyor and its supporting and driving mechanism as shown in the drawings are also shown and described in greater detail in my aforesaid copending application, Serial No. 66,611.

The ware to be treated is subjected during its passage through the lehr tunnel on the moving conveyor to different treatments in successive portions of such tunnel. Such ware is subjected to a preliminary heating during the movements of the ware from the front end of the tunnel to a place in the ware tunnel approximating that which is indicated by the vertical line 36, Figs. 1 and 3. In other words, this portion of the lehr tunnel, which may be designated zone A, is constructed and provided with heating and gas circulating arrangements to gradually increase the temperature of the ware from the relatively low temperature which it may have when it is loaded onto the lehr conveyor to a relatively high temperature as the ware passes through this portion of the lehr. In this zone, provision also is made, as hereinafter will be explained, to remove from the tunnel the fumes resulting from the treatment of the ware to fuse or mature the decoration thereof and from the nature of the materials used for the decoration of the ware.

Figure 3:
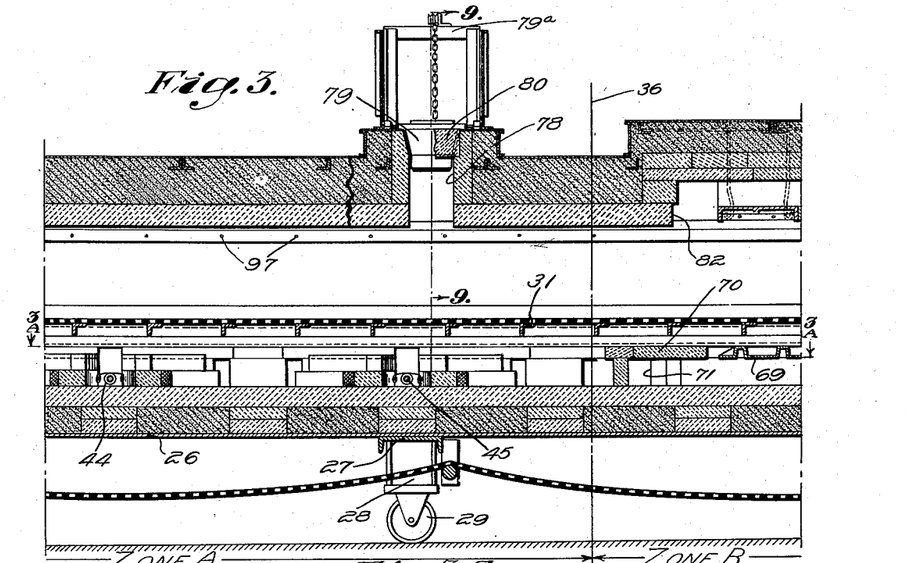
Figure 3A:
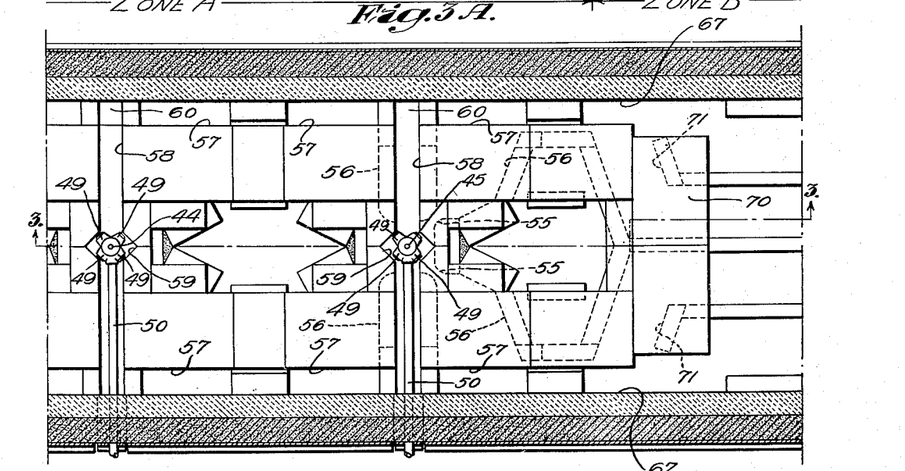
Figure 4:
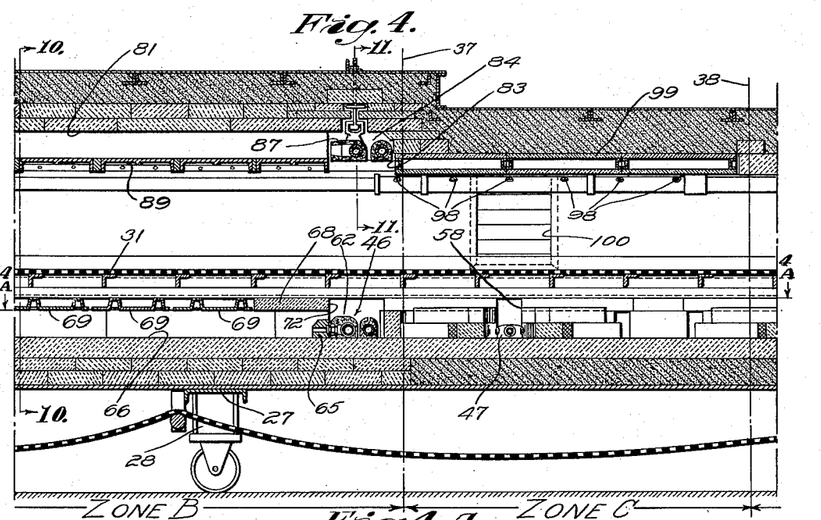

The ware then passes through a zone designated B, Fig. 1, and Figs. 3 and 4 considered together, extending approximately from the vertical line indicated at 36, Figs. 1 and 3, approximately to the place indicated by the vertical line 37, Figs. 1 and 4. In this zone the ware is brought to a sufficiently high temperature to effect fusing or maturing of the decoration on the ware.

From zone B, the ware passes through a zone designated C, extending approximately from the portion of the lehr marked by the line 37, Figs. 1 and 4, approximately to the place indicated by the line 38 in the same views. This is a zone for effecting relatively rapid cooling of the ware to bring such ware from its relatively high temperature down to the upper annealing limit of approximately 1000 or 1050° Fahrenheit.

Figure 5:
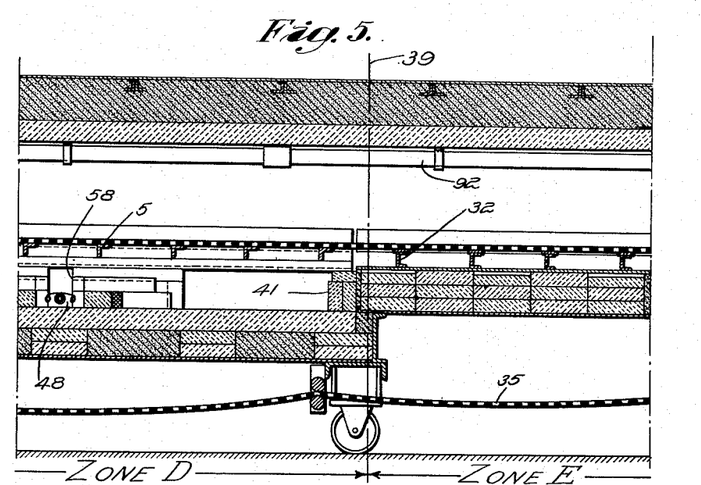

The ware then passes through a zone, designated D, extending from zone C approximately to a place indicated by the line 39 in Figs. 1 and 5. In this zone the temperature of the ware is gradually lowered from the upper annealing temperature of approximately 1000 to 1050° to the lower annealing limit which may be approximately 750 to 800° Fahrenheit. After passing through the reannealing and slow cooling zone D, the ware may be subjected to influences designed and intended rapidly to reduce the temperature thereof.

A zone marked E, extending from the line 39 approximately to the line 40 at the exit end of the ware tunnel, Figs. 1 and 7, constitutes the zone in which the cooling of the ware is accelerated.

After leaving the final zone of the tunnel, the ware is moved by the conveyor on the inspection and packing table through a zone which may be designated F, Figs. 1 and 7, in which such ware may be inspected and packed after it has reached room temperature or a temperature at which it can be handled conveniently.

The present invention provides structural arrangements and provisions in the several zones of the lehr for performing the functions above pointed out. These structural provisions and arrangements will now be described.

As indicated by the above description of the treatment of the ware during its passage through the lehr tunnel, zones A, B, C and D together comprise the portion of the tunnel which may be referred to as the heated section, because the ware may be subjected therein to heating influences sufficient either to raise the temperature of the ware or to retard natural cooling thereof. As shown by these views, considered together, the tunnel is of greater depth in this heated section than in the remainder thereof, the bottom being offset upwardly at 41, Fig. 5, so as to provide a long shallow sub-space or pit beneath the upper reach of the conveyor. This shallow sub-space or pit accommodates heating and air-circulating provisions comprising spaced burner assemblies 42, 43, (Figs. 2 and 2—A); 44, 45, (Figs. 3 and 3—A); 46, 47, (Figs. 4 and 4—A); and 48 (Fig. 5).

*The heating and air circulating provisions in the tunnel sub-space or pit (Figs. 2, 2—A, 3, 3—A, 4, 4—A and 5)*

The burner assembly 42 is located nearest to the front end of lehr. It comprises a central burner body provided with four substantially horizontal radial jet type nozzles 49. A fuel supply pipe 50 extends through one side of the lehr tunnel structure and is connected with the burner body. The nozzles are spaced approximately 90° apart. The burner body is located in the shallow sub-space or pit midway between the sides of the lehr tunnel at a predetermined distance from the front end of the tunnel and with the respective nozzles so disposed that two of them are directed forwardly and laterally toward the side walls of the lehr tunnel while the remaining two nozzles are directed rearwardly and laterally toward these side walls. In other words, the nozzles 49 are disposed obliquely to both the longitudinal and transverse axes of the lehr tunnel so that each of these nozzles is at about a 45° angle with each of such axes. The burner nozzles may be removably attached to the burner body so that nozzles of different sizes may be used selectively and in various combinations. Thus, burner nozzles of different sizes may be employed to direct flames and gases of combustion toward the respective sides of the lehr tunnel or the size or sizes of the front nozzles and of the rear nozzles may be different.

Figure 2:
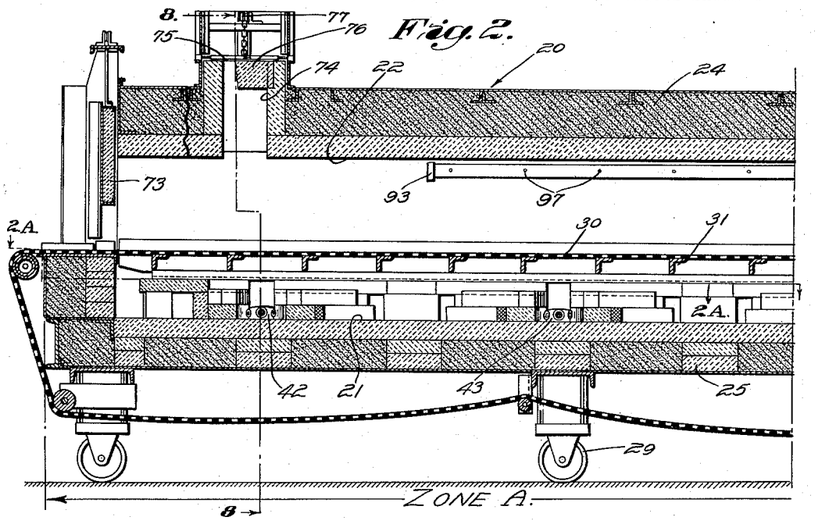
Figs. 2 to 7 inclusive are views which together show the lehr of Fig. 1 in longitudinal vertical section.

The front diagonal nozzles 49 project flames and products of combustion through relatively narrow throat passages 51 into generally diagonal but laterally enlarging main combustion passages 52, Fig. 2—A. The passages 52 communicate with the ware tunnel proper through side outlets 53 and a front outlet 54, the latter being located at the extreme front end of the lehr tunnel and extending completely across such tunnel. The rear diagonal nozzles 49 project flames and products of combustion through narrow throat passages 55 into generally diagonal laterally enlarging rear main combustion passages 56 which have outlets 57 adjacent to the sides of the lehr tunnel by which communication is established between these passages and the overlying ware tunnel proper. As best seen in Fig. 2—A, the passages and outlets referred to are provided by placing suitable refractory division or partition and cover members in the shallow sub-space or pit in appropriate positions in respect to one another, to the side walls of the tunnel, and/to the associate burner assembly.

The arrangement of these refractory division or partition and cover members also is such as to provide a transverse intake channel 58 having an enlarged middle portion 59 in which the burner assembly 42 is located and which communicates directly with the throat passages 51 and 55 adjacent to the tips of the burner nozzles 49. This transverse intake channel may be closed at its ends by refractory blocks 60, Fig. 2—A, so as to cut off communication between the intake channel and the portions of the lehr tunnel proper between the side members of the conveyor supporting frame and the tunnel side walls. The intake channel is however in open communication at its top with the lehr tunnel proper completely across the space beneath the ware carrying reach of the conveyor so that air and gases from the tunnel may pass downwardly through the open-work conveyor and against the ware on such conveyor to the underneath intake passage. Air and gases thus may be drawn from the tunnel for re-circulation through the tunnel.

The burner assemblies 43 (Figs. 2 and 2—A), 44 and 45 (Figs. 3 and 3—A), 47 (Figs. 4 and 4—A) and 48 (Fig. 5) may be substantially like the burner assembly 42 and each may be provided with a fuel supply pipe and with associate combustion passages, outlets to the lehr tunnel proper and an intake channel for receiving air and gases from the tunnel substantially as have been described for the burner assembly 42 except that both the front and rear diagonal combustion passages of the burner assemblies 43, 44, 45, 47 and 48 are like the rear diagonal combustion passages 56 and have their outlets to the tunnel proper located adjacent to the side walls of the tunnel. The same reference characters have been applied to like parts of these several burner assemblies and associate structures and no further description thereof is believed to be necessary herein.

Figure 4A:
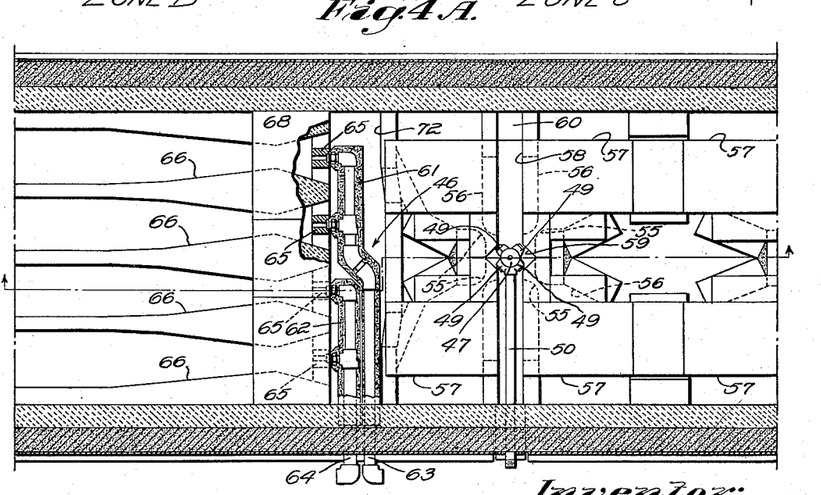

The burner assembly 46 (Figs. 4 and 4—A) comprises a pair of transversely alined elongate burner heads 61 and 62, provided with separate fuel supply pipes 63 and 64, respectively, and arranged in a transverse channel 72 in the shallow sub-space or pit so that the heads 61 and 62 respectively are located at opposite sides of the longitudinal median line of the lehr tunnel. These heads are closed at their free ends and are provided with similar forwardly turned spaced nozzles 65 for projecting flames and combustible mixtures of fuel and air into the open mouths of similar Venturi passages 66. These Venturi passages extend forwardly in the tunnel subspace or pit parallel with the direction of length of the tunnel. Two of the Venturi passages 66 are located at one side and two at the opposite side of the longitudinal median line of the tunnel. The passages 66 at opposite sides of the tunnel middle line communicate with the tunnel proper through similar outlet ports 67 adjacent to the side walls of the tunnel.

Figure 10:
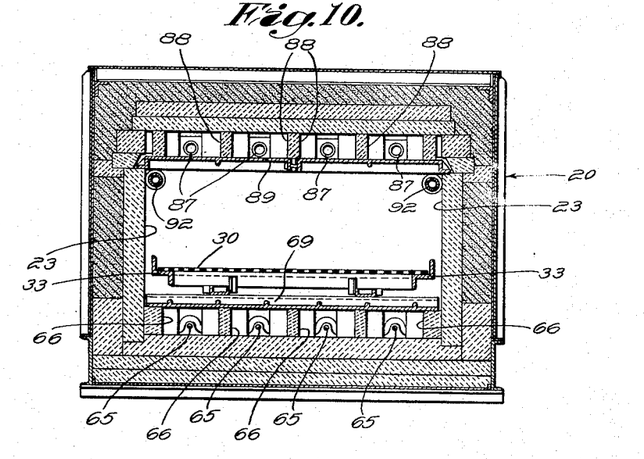
Fig. 10 is a vertical section taken on the line 10—10 of Fig. 4.

The cover of the passages 66 above the nozzles 65 and the restricted throat portions of the passages 66 may comprise a refractory slab or tile 68. Forwardly of the member 68 and extending for the major part of the length of the passages 66 are metallic cover members 69 which may be channeled or corrugated transversely thereof at intervals, as shown in Fig. 4, and also longitudinally ribbed as shown in Fig. 10. The members 69 will radiate heat upwardly to the ware on the overlying portion of the conveyor and some of the products of combustion may enter the tunnel through spaces between and around the several members 69. Such spaces permit expansion and contraction of the members 69 without buckling or warping. Forwardly of the foremost member 69 is a transverse refractory cover member or tile 70 above the forward end portions of the two inner passages 66 and overlying the two outer passages 66 sufficiently to form portions of the inner walls of the outlet ports 67. The heated products of combustion from the forward portions of the two inner passages 66 are directed to the ports 67 by short laterally and forwardly extending connecting passages 71.

The channel 72, in which the burner heads 61 and 62 are disposed, is in open communication at its top with the tunnel proper and constitutes an intake passage to and through which air and gases from the tunnel are drawn by the injective action of the burner nozzles and the Venturi passages.

Burner assemblies and associate passages, outlets, air inlets and air circulating provision having many features in common with those of the foregoing description although having a different relative arrangement in the lower portion of the heated section of the lehr are shown and described in my aforesaid co-pending application, Serial No. 66,611.

*The venting, heating and air circulating provisions at the top of the heated section of the lehr tunnel*

The lehr tunnel may be provided with a vertically adjustable front door or closure 73 which, during the operation of the lehr, will be maintained at a height sufficiently above the conveyor to clear the ware on the conveyor at the entrance end of the lehr. The space beneath the door or closure 73 may serve as a vent for part of the gaseous products of combustion, as will presently be explained.

The lehr also is provided with a front stack 74 which, as best seen in Fig. 8, may extend substantially the full width of the lehr tunnel and be controlled by a pair of dampers 75 which are pivoted at their adjacent ends on a supporting member 76 that is located approximately midway between the side walls of the stack 74. Operating mechanism for raising and lowering the dampers 75 and for maintaining them in adjusted raised positions is indicated at 77. It is obvious that this operating mechanism may be adjusted by altering the effective length of one or both of the chains which are connected with the respective dampers to effect differential opening of such dampers, if desired, or any other suitable operating mechanism which will permit such adjustment may be used in lieu of the operating mechanism shown.

Figure 9:
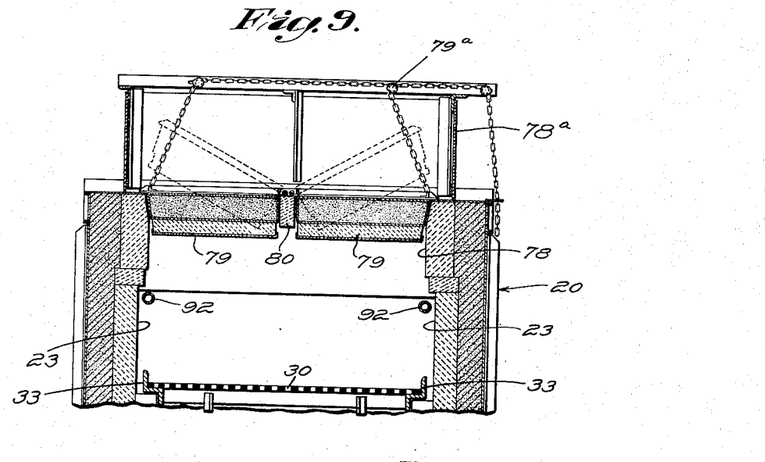
Fig. 9 is a vertical section taken on the line 9—9 of Fig. 3.

The lehr has a second stack, designated 78, Figs. 1, 3 and 9, which is located a substantial distance rearwardly of the stack 74 and relatively near the junction of the preliminary heating zone A and the decoration fusing or maturing zone B. As shown best in Fig. 9, the stack 78 also may extend substantially the full width of the lehr tunnel and may be controlled by a pair of dampers 79 which are pivotally connected at their adjacent edges to a supporting member 80 which is located intermediate the side walls of the stack. An operating mechanism for the dampers 79 is generally designated 79—A, Fig. 9. The dampers may comprise lower refractory members backed by insulation and may tightly close the stack when the dampers are closed.

It will be noted by reference to Figs. 8 and 9 that the stacks 74 and 78 have windshields, shown as metallic top extensions designated 74—a and 78—a, respectively, for shielding the stacks from currents of air or wind in the factory which might interfere with the desired control of exhaust of gases from these stacks.

The decoration fusing or maturing zone B of the lehr is provided with a top combustion chamber 81 (shown partly in Fig. 3 and partly in Fig. 4), which is located in an upwardly offset or relatively high portion of the lehr structure.

Figure 11:
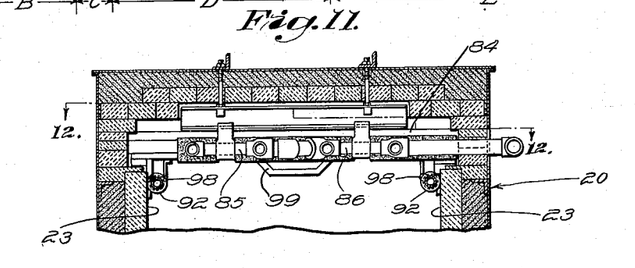
Fig. 11 is a vertical section taken on the line 11—11 of Fig. 4.
Figure 12:
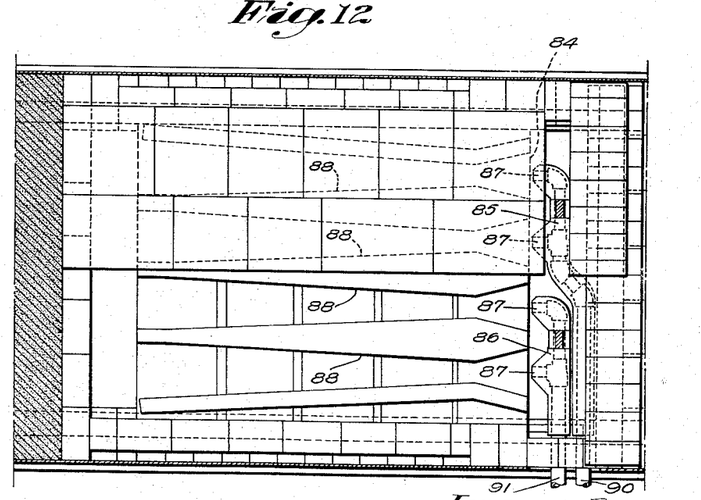
Fig. 12 is a horizontal section taken on the line 12—12 of Fig. 11.

The combustion chamber 81 has a transversely extending bottom outlet 82 at its forward end by which it communicates with the interior of the lehr tunnel. A transversely extending inlet 83 establishes communication between the interior of the tunnel and a space 84 at the rearward end of the combustion chamber 81. As shown in Fig. 12, a pair of alined elongated burner heads 85 and 86 are located in the space 84 at opposite sides of the longitudinal median line of the lehr tunnel, these heads being suspended from above as shown in Fig. 11. These burner heads have spaced forwardly directed nozzles 87 for projecting flames and combustible fuel mixtures into the open mouths of Venturi passages 88 into which the combustion chamber 81 is longitudinally divided. In the structure shown (Figs. 10 and 12), there are two of the Venturi passages 88 at each side of the longitudinal median line of the top combustion chamber.

The bottom 89 of the combustion chamber 81, including the bottom walls of the Venturi passages 88, comprises suitably connected and supported heat conducting and radiating members, shown as flanged metal plates, which may be ribbed or corrugated transversely and longitudinally thereof. This bottom wall 89 will be heated by the flames and heated products of combustion in the Venturi passages 88 and will radiate heat downwardly onto the ware on the conveyor in the decoration fusing or maturing zone B of the lehr. The respective burner heads 85 and 86 have separate fuel supply pipes 90 and 91, respectively, (Fig. 12) so that different heating effects may be produced in the upper combustion chamber 81 at opposite sides of the longitudinal median line thereof. The injective action of the burners 87 and of the Venturi passages 88 will circulate air and gases from the tunnel through the inlet 83 to the passages 88 and thence back to the tunnel through the outlet 82.

A pair of air pipes 92 enter the cooling section of the lehr and extend forwardly in the upper corner portions of the tunnel nearly to the front stack 74. The pipes 92 may be supported in any suitable known way, as by hangers carried by the tunnel roof structure or fastening devices secured to the side walls of the tunnel and permitting expansion and contraction of the pipes. The front ends of the pipes 92 may be closed as by caps, such as that indicated at 93 in Fig. 2.

Outside of the lehr, the pipes 92 may be joined to a common air supply pipe 94, Fig. 6, which may be operatively connected with the discharge side of an air blower 95, Fig. 7. Each of the pipes 92 may be controlled independently of the other, as by manually adjustable valves or dampers, such as that indicated at 96 in Fig. 6.

In the preliminary heating zone of the lehr tunnel, the pipes 92 may have spaced lateral orifices or nozzles 97, as shown in Figs. 2 and 3, for projecting air laterally toward the middle of the upper part of a tunnel. This air will have been preheated during its passage in the pipes within the lehr tunnel and may apply heat to the ware in part of the preliminary heating zone. The jets of preheated air from the orifices or nozzles 97 in this zone of the tunnel also will aid in setting up and maintaining generally transverse circulatory movements of the tunnel gases and may be at sufficient velocity to accelerate to a substantial extent the circulatory movements of gases which are produced by the action of the underneath pressure burner assemblies and associate passages. The circulating gases will pass downwardly through the open work conveyor, scrubbing all ware on any transverse section of such conveyor. In the lower part of the tunnel, the gases will follow divergent paths toward the side walls of the tunnel along which they will move upwardly to the upper part of the tunnel and thence toward the longitudinal median line of the tunnel for further circulatory movements therein. These generally transverse circulatory movements of the tunnel gases will be attended by a slight forward drift in the preliminary heating zone by reason of the action of the stacks 74 and 78 and the venting space beneath the door 73 at the front of the ware tunnel.

These provisions tend to eliminate or obviate local irregularities in the heat gradient longitudinally of the lehr tunnel and also to produce uniformity of temperature transversely of the tunnel at any place along its length.

The walls of the pipes 92 may be imperforate from the rearward end of the preliminary heating zone A through the decoration fusing or maturing zone B to the rapid cooling zone C, Fig. 4. In that zone, the pipes 92 are provided with spaced orifices or nozzles 98 which direct jets of air upwardly and toward the middle of the ware tunnel, as indicated in Fig. 11. This air will be cooler than the air discharged from the orifices 97 and is intended to accelerate cooling of the ware that is being moved through the rapid cooling zone C. As shown in Figs. 4 and 11, the portion of the lehr comprising the rapid cooling zone C may have a double-walled or hollow deflector 99 set in the top wall thereof in lieu of a portion of the usual refractory material that otherwise would form this portion of the top wall. The deflector 99 may be made of molded insulating board having high heat resisting qualities. As best seen in Fig. 11, this deflector depends within the upper part of the ware tunnel at the middle thereof for substantially the full length of the rapid cooling zone, being of substantially U-shape in cross section with the sides thereof inclined outwardly and upwardly at their outer surfaces. The currents of air from the orifices or nozzles 98, on striking these side walls of the deflector, will be deflected downwardly through the underlying conveyor, and, hence will scrub the ware on such conveyor and effect a relatively rapid but uniform reduction of temperature of such ware. These circulatory currents of air in the rapid cooling zone C will be aided by the injective action of the burner assembly 47 in the underlying portion of the shallow sub-space or pit beneath the tunnel proper. An inspection opening 100 in the side of this portion of the lehr may normally be closed by a suitable door or closure means.

*Cooling provisions in the cooling section of the lehr*

The cooling section of the lehr, comprising the portion thereof extending approximately from the vertical line 39, Fig. 5, to the rearward end of the tunnel and consisting of the accelerated cooling zone E, preferably is provided with means for producing regulable accelerated cooling of the ware passing therethrough. The specific cooling provisions in this section of the lehr may be generally similar to those which are illustrated and described in detail in my aforesaid copending application, Serial No. 66,611. Since these specific provisions do not per se form part of the present invention, the illustration thereof is fragmentary or diagrammatic, and the description thereof will be confined to pointing out the general construction and mode of functioning of such provisions.

As shown in Figs. 6 and 7, considered together, an air pipe 101 (shown in dotted lines) is located in an upper corner portion of this section of the ware tunnel and extends from the exit or rear end of such tunnel for the greater part of the length of the accelerated cooling zone E, the front end of such pipe 101 terminating at about the place that the pipes 92 pass through the top wall of the lehr structure. The pipe 101 is supplied with cooling air by a supply pipe 102 which is operatively connected with the discharge side of the aforesaid blower 95. At its inner side, the pipe 101 is provided with spaced nozzles or orifices 103 which project jets or streams of cooling air toward the middle portion of the upper part of the ware tunnel. As disclosed in my aforesaid application, Serial No. 66,611, the jets of cooling air may be projected at right angles with the pipe 101 throughout the entire length of such pipe or, in the rearward portion of the ware tunnel, such jets may be given a direction of movement having a slight forward component. A second pipe (not shown), like that indicated at 101, is located in the other upper corner portion of the ware tunnel or directly opposite the pipe 101, and also is connected with the air supply pipe 102, as explained in application Serial No. 66,611. The jets or streams of air from these cooling pipes will strike the sides of deflectors 104, 105, 106, 107, 108, 109, 110, 111 and 112, which are supported in series or aligned relation in the middle portion of the upper part of the ware tunnel. The deflectors are hollow and the interiors of the deflectors 103—104, 105, 106, 107, 108, 109, 110 and 111, may be provided with vents or stacks leading to the atmosphere and respectively indicated at 113, 114, 115, 116, 117, 118, 119 and 120. The deflectors communicating with these stacks may have the upper portions of the side walls thereof pivoted to the remaining portions of such side walls so as to constitute pivoted dampers which may be opened more or less by adjustment of operating mechanisms 121, 122, 123, 124, 125, 126, 127, 128 and 129, respectively.

Predetermined amounts of the streams of air circulating in generally transverse directions in this portion of the ware tunnel may thus be exhausted through the dampered openings of these deflectors and their associate stacks. The rearward deflector 112 may have imperforate walls. The circulatory movements of the currents of air impinging against the sides of this deflector will have a forward component so as to promote forward drift of the tunnel gases.

*General operation of the lehr*

The decorated ware may be at a relatively low temperature when moved into the lehr tunnel. Heated products of combustion produced by the operation of the front burner assembly 42 together with entrained gases obtained from the tunnel may pass upwardly through the front outlet 54 and the side outlets 53 through the openwork conveyor and about the ware in the extreme front end portion of the ware tunnel. Some of these products of combustion and entrained gases may pass from the ware tunnel through the space beneath the door 73. The remainder of the products of combustion and entrained gases will move upwardly in the ware tunnel toward the stack 74. Some of these gaseous products will be drawn downwardly at the middle of the tunnel through the inlet to the space surrounding the burner assembly 42 by the inductive action of the burner nozzles, thus producing circulatory movements of heated gases even in the extreme forward end portion of the ware tunnels.

As the ware is moved rearwardly in the tunnel through the preliminary heating zone A, it will be subjected to further circulatory currents of heated gases occasioned by the projection into the tunnel of jets of preheated air from the nozzles 97 of the air pipes 92 and by the operations of the inductive burner assemblies 43, 44 and 45 in the underlying sub-space or pit. The circulatory currents will move in directions mainly transverse of the lehr tunnel but may have forward components by reason of the pull of the front stack 74, or, in the case of the currents at the rear of the stack 78 by reason of the pull of the latter. Heat also may be applied to the ware in the rearward portion of the preliminary heating zone by the products of combustion and heating gases passing thereinto from the upper and lower heating means of the succeeding zone.

The fuel supply pipes for the respective burner assemblies may be individually controlled, as is usual. The heating effects and the inductive actions of the successive burner assemblies therefore may be individually regulated in view of the temperatures that are desired for the ware in different portions of the tunnel. The provisions permit the ware to be brought uniformly and gradually from its initial or entering temperature to a predetermined higher temperature by the time such ware passes from the preliminary heating zone A to the decoration fusing or maturing zone B.

In the decoration fusing or maturing zone B, the ware will be subjected to heat radiated both from the overhead metallic bottom wall 89 of the top combustion chamber 81 and from the metallic cover members 69 of the underneath combustion chamber. In addition, there may be some circulatory movements of tunnel gases in this zone by reason of convection currents and the upward passage between the several members 69 of products of combustion from the underneath combustion passages. However, the heating of the ware in this zone is mainly by radiation.

It ordinarily is desirable to bring the ware in the decoration fusing or maturing zone B to a temperature higher than the upper annealing limit of such glassware so as to assure effectual fusing or maturing of the decoration.

The fumes resulting from the decoration fusing or maturing treatment of the ware will be exhausted from the ware tunnel, principally by the adjacent stack 78.

The conveyor moves the ware from the decoration fusing or maturing zone through the rapid cooling zone C, in which there is a relatively intensive cooling action by circulatory currents produced by the cooling air jets from the orifices or nozzles 98 and the interposed deflector 99. The heating arrangements in the lower part of this zone of the lehr, comprising the burner assembly 47 and associate passages, may be used to modify the cooling action of the cooling air jets as and to the extent required. When so used such heating means aids in producing and maintaining in this zone circulatory movements of gases having the desired effect on the ware.

The temperature of the ware thus may be lowered rather quickly, although uniformly, from the relatively high temperature required for the decoration fusing or maturing treatment to the upper annealing limit, usually about 1000° or 1050° F. by the time or shortly after the ware is moved into the re-annealing or slow cooling zone D. The temperature conditions and circulatory movements of the gases in the re-annealing or slow cooling zone D of the ware tunnel will effect gradual and uniform reduction of temperature of the ware from approximately the upper annealing limit to a lower annealing limit of approximately 750° to 800° F. by the time the ware reaches the cooling section proper of the lehr, i. e., the zone E in which the cooling of the ware may be accelerated.

The provisions which have been described, including the jets of air, for circulating products of combustion and gases in the tunnel produce a highly oxidizing atmosphere in the heated portion of the tunnel and thus prevent objectionable change of color and impairment of the appearance of the decoration on the ware.

The invention therefore is not to be limited beyond the terms of the appended claims, construed as broadly as the prior art will permit.

I claim:

1. A lehr for decorating and re-annealing glassware, comprising an elongate tunnel, an open-work conveyor for transporting glassware therethrough, means for heating the tunnel by the introduction therein of combustion gases, said means including pressure burners for discharging hot gases into the tunnel below the conveyor and for circulating and recirculating some of said gases in orbital paths, moving at the bottom of the lehr from the longitudinal center thereof toward the lateral side walls, up said side walls and returning downwardly through the ware adjacent to the center of the tunnel, and means for removing some of said circulating gases at a place spaced from but adjacent to the ware-entering end of the tunnel and for causing a general movement of the gases toward that end of the tunnel.

2. In a decorating lehr, a tunnel providing a pre-heating zone, a decoration fusing or maturing zone and a re-annealing zone, a woven wire conveyor for transporting glassware through the tunnel, means for heating the preliminary heating zone comprising a plurality of pressure burners located adjacent the longitudinal center line of the lehr and below the conveyor, so constructed and arranged as to introduce and recirculate hot gases in generally orbital paths, moving at the bottom of the tunnel toward the side walls, up the side walls and returning through the glassware adjacent the center, and means located adjacent the upper corners of the tunnel for introducing jets of preheated air into said circulating gases to accelerate the circulation thereof in said preheating zone.

3. A lehr for decorating glassware comprising an elongate tunnel providing a decoration fusing or maturing zone, an open-work conveyor for transporting glassware through the tunnel, heating means in said zone comprising pressure burners below and above said conveyor, Venturi passages associated with the burners and provided with inlets from the tunnel and outlets for discharging into the tunnel the products of combustion generated by said burners, said Venturi passages having walls next to said tunnel constructed and arranged to be heated by said products of combustion and to radiate heat to the glassware in said zone, and a damper-controlled vent located between the entrance end of the tunnel and the Venturi passages for removing gases from said tunnel.

4. A lehr for decorating glassware comprising an elongate tunnel providing a decoration fusing or maturing zone located between the ends of said tunnel, an open-work conveyor for transporting decorated glassware through said tunnel, separately controllable banks of pressure burners in said zone above and below said conveyor, the burners of said banks being spaced apart transversely of the tunnel, and Venturi combustion passages for the individual burners of each bank, said Venturi passages having inlets and outlets both communicating with said tunnel, the place of communication of said outlets with said tunnel being nearer to the ware-entering end of said tunnel than that at which said inlets communicate with the tunnel, the walls of said passages next to said tunnel being highly heat conductive and constructed and arranged to radiate heat to the glassware passing through said zone.

5. A lehr for decorating glassware comprising an elongate tunnel providing a decoration fusing and maturing zone intermediate the ends of the tunnel, banks of pressure burners in the upper and lower portions of said zone, some of the burners of each bank being located at one side and the remainder at the other side of the longitudinal median line of the tunnel, the burners at the opposite sides of said longitudinal median line being separately controllable, and means providing combustion passages for the burners, said combustion passages having inlets from the tunnel adjacent to said burners and outlets to the tunnel nearer to the ware-entering end of the latter.

6. In a lehr for decorating and re-annealing glassware, an elongate tunnel providing successive decoration fusing or maturing, rapid cooling, and re-annealing zones, an open-work conveyor for passing glassware through the tunnel, heating means in the fusing or maturing zone constructed and arranged to raise the temperature of the glassware in said zone above its upper annealing temperature, means for introducing cooling air directly into the rapid cooling zone of said tunnel in jets of such character and so directed as to cause circulatory movements of the cooling air and the tunnel atmosphere in closed paths extending generally in directions transverse to the tunnel and passing downward through the open-work conveyor to subject the ware thereon to the cooling action of the circulating cooling media, and for controlling the temperature gradient in the re-annealing zone to re-anneal the decorated glassware passing therethrough.

7. A lehr for decorating glassware comprising an elongate tunnel having a heated section and a cooling section, an open work conveyor for transporting glassware through the tunnel, means below the conveyor in the heated section of the tunnel for generating and introducing into the tunnel heated products of combustion and for entraining gases from the tunnel to produce in the tunnel generally transverse currents of products of combustion and heated gases moving upwardly adjacent to the side walls of the tunnel to the upper part thereof, then laterally toward the longitudinal median portion of the tunnel, then downwardly in enveloping relation to the glassware on the conveyor and through the conveyor for further circulation in the tunnel with newly generated products of combustion, and means for introducing jets of preheated air into the upper part of the heated section of the tunnel to augment and accelerate the circulatory movements of said products of combustion and tunnel gases.

8. A lehr for decorating glassware, comprising an elongate tunnel having a heated section and a cooling section, an open work conveyor for transporting glassware through the tunnel, means below the conveyor in the heated section of the tunnel for generating and introducing into the tunnel heated products of combustion for entraining gases from the tunnel to produce in the tunnel generally transverse currents of products of combustion and heated gases moving upwardly adjacent to the side walls of the tunnel to the upper part thereof, then laterally toward the longitudinal median portion of the tunnel, then downwardly in enveloping relation to the glassware on the conveyor and through the conveyor for further circulation in the tunnel with newly generated products of combustion, means for introducing jets of preheated air into the upper part of the heated section of the tunnel to augment and accelerate the circulatory movements of said products of combustion and tunnel gases, and means adjacent to front end of said tunnel for exhausting gases from the tunnel and for causing a drift toward the front end of the tunnel of said circulating products of combustion and tunnel gases.

9. In a lehr for decorating glassware, an elongate tunnel having in succession a preliminary heating zone, a decoration fusing or maturing zone, a rapid cooling zone, a slow cooling and re-annealing zone, and an accelerated cooling zone, an open work conveyor for transporting glassware through said tunnel, means for heating the ware in the preliminary heating zone by circulating and re-circulating products of combustion and tunnel gases in contact with such ware substantially throughout the length of the preliminary heating zone, means adjacent to the ware-entering end of the tunnel for exhausting some of the gases from the preliminary heating zone, heat radiating members located above and below the ware on the conveyor in the decoration fusing or maturing zone for heating the ware therein, means for removing from the tunnel fumes resulting from the fusing or maturing of the decoration on the ware, together with some of the tunnel gases, means for causing circulatory movements of cooling air in the rapid cooling zone to reduce the temperature of the ware therein from that required for the fusing or maturing of the decoration to the upper annealing limit, means in the slow cooling and re-annealing zone for regulating the drop of temperature of the ware from its upper annealing limit to its lower annealing limit during the passage of the ware through said zone, and means effective in the accelerated cooling zone for producing relatively rapid further cooling of the ware.

10. In a lehr for decorating glassware, an elongate tunnel having successive preliminary heating and decoration fusing or maturing zones, an open work conveyor for transporting glassware through said tunnel, a series of combustion chambers in the lower part of the preliminary heating zone of said tunnel, pressure burners in said combustion chambers for projecting products of combustion through said combustion chambers into said tunnel at places adjacent to the side walls thereof and for drawing tunnel gases downwardly through said conveyor into said combustion chambers and thereby setting up generally transverse circulatory and recirculatory movements of products of combustion and tunnel gases in the preliminary heating zone of said tunnel, controllable exhaust means adjacent to the forward end of said tunnel, and means for applying heat both from above and from below to the ware in said decoration fusing or maturing zone to bring the ware therein to the temperature required for the fusing or maturing of the decoration on the ware.

11. In a lehr for decorating glassware, an elongate tunnel having successive preliminary heating and decoration fusing or maturing zones, an open-work conveyor for transporting glassware through said tunnel, a series of combustion chambers in the lower part of the preliminary heating zone of said tunnel, pressure burners in said combustion chambers for projecting products of combustion through said combustion chambers into said tunnel at places adjacent to the side walls thereof and for drawing tunnel gases downwardly through said conveyor into said combustion chambers and thereby setting up generally transverse circulatory and re-circulatory movements of products of combustion and tunnel gases in the preliminary heating zone of said tunnel, controllable exhaust means adjacent to the forward end of said tunnel, means for applying heat both from above and from below to the ware in said decoration fusing or maturing zone to bring the ware therein to the temperature required for the fusing or maturing of the decoration on the ware, and a dampered stack communicating with said tunnel adjacent to the forward end of said decoration fusing or maturing zone.

12. In a lehr for decorating glassware, an elongate tunnel having a decoration fusing or maturing zone, an open work conveyor for transporting decorated glassware through said tunnel, and means for heating the ware passing through said zone to a temperature sufficiently high to fuse or mature the decoration on the glassware, said means comprising combustion chambers in said zone respectively located above and below the ware on the conveyor in said zone, means for supplying combustible fuel mixtures to said chambers, said combustion chambers having heat conductive walls constructed and arranged to be heated by the combustions therein and respectively to radiate heat downwardly and upwardly onto the ware therebetween, said combustion chambers also having outlets for introducing heated products of combustion into the tunnel.

13. In a lehr for decorating glassware, an elongate tunnel having a decoration fusing or maturing zone, an open work conveyor for transporting decorated glassware through said tunnel, and means for heating the ware passing through said zone to a temperature sufficiently high to fuse or mature the decoration on the glassware, said means comprising combustion chambers in said zone respectively located above and below the ware on the conveyor in said zone, means for supplying combustible fuel mixtures to said chambers, said combustion chambers having heat conductive walls constructed and arranged to be heated by the combustions therein and respectively to radiate heat downwardly and upwardly onto the ware therebetween, said combustion chambers having outlets for introducing heated products of combustion into the tunnel and inlets for drawing from the tunnel gases to be commingled with the products of combustion in the combustion chambers for delivery to said tunnel with said products.

14. In a lehr, an elongate tunnel having a zone in which the ware is to be heated to a relatively high temperature, said tunnel having a pair of upper and lower combustion chambers in said zone extending longitudinally thereof and each communicating with the tunnel both at its forward and rearward ends, the walls of said combustion chambers next to the tunnel being formed of material adapted to be heated by combustion in said chambers and to radiate heat into the tunnel, means dividing said combustion chambers into Venturi passages having discharge ends in communication with the tunnel at the forward ends of said combustion chambers, and pressure burners for discharging combustible mixtures into said Venturi passages.

15. In a lehr, an elongate tunnel having a zone in which the ware is to be heated to a relatively high temperature, said tunnel having a pair of upper and lower combustion chambers in said zone extending longitudinally thereof and each communicating with the tunnel both at its forward and rearward ends, the walls of said combustion chambers next to the tunnel being formed of material adapted to be heated by combustions in said chambers and to radiate heat into the tunnel, means dividing said combustion chambers into Venturi passages having their discharge ends in communication with the tunnel at the forward ends of said combustion chambers, and pressure burners for discharging combustible mixtures into said Venturi passages, said burners being regulable to vary the heating effects respectively produced at different sides of the longitudinal median line of said tunnel.

16. In a lehr, an elongate tunnel having a zone of relatively high temperature spaced from both the front and rear ends of the tunnel, and air conducting means extending in said tunnel past said zone of high temperature, said air conducting means being constructed and adapted to introduce cooling air into the tunnel rearwardly of said zone and heating air into the tunnel in advance of said zone.

17. In a lehr, an elongate tunnel having a zone of relatively high temperature spaced from both the front and rear ends of the tunnel, and a pair of air conducting pipes extending in the vicinity of the upper corner portions of said tunnel past said zone of high temperature, said pipes having orifices located in advance of said zone for discharging heated air into the tunnel toward the middle portion thereof and also having orifices located rearwardly of said zone for discharging cooling air into the tunnel toward the longitudinal median portion thereof.

18. The method of treating glassware which comprises the steps of passing the ware to be treated through an elongate lehr tunnel, heating the ware in a zone beginning with the ware-entering end of the tunnel and extending longitudinally of the tunnel for a substantial part of the length thereof by introducing heated products of combustion into said zone of the tunnel at intervals along the length of said zone in such manner as to cause therein generally transverse circulatory movements of the tunnel atmosphere and the products of combustion, and accelerating said circulatory movements of said products of combustion and tunnel atmosphere by projecting jets of heated air into said zone of the tunnel.

19. The method of treating glassware which comprises the steps of passing the ware to be treated through an elongate lehr tunnel, heating the ware in a zone beginning with the ware-entering end of the tunnel and extending longitudinally of the tunnel for a substantial part of the length thereof by introducing heated products of combustion into said zone of the tunnel at intervals along the length of said zone in such manner as to cause generally transverse circulatory movements of the tunnel atmosphere and the products of combustion, and increasing the heating effect on the ware of the circulating products of combustion and tunnel atmosphere by adding thereto jets of heated air introduced into said zone of the tunnel.

20. The method of treating glassware which comprises the steps of passing the ware to be treated through an elongate lehr tunnel having a heating zone extending from the ware-entering end of the tunnel longitudinally thereof for a substantial part of the length of said tunnel, generating products of combustion adjacent to said zone, re-circulating the products of combustion in said zone by energy, derived at least in part from the velocity of the gases introduced into said zone of the tunnel and in such manner and direction that the re-circulated gaseous media move toward the sides of the tunnel at a level below the path of the ware, thence up the sides of the tunnel, thence toward the center thereof above the path of the ware and thence downwardly through the path of the ware to the aforesaid level below the path of the ware to be re-circulated in the tunnel, and accelerating the movements of the re-circulating gaseous media by applying thereto jets of preheated air in upper part of said zone of the tunnel.

21. The method of treating glassware which comprises the steps of passing the ware to be treated through an elongate lehr tunnel having a heating zone extending from the ware-entering end of the tunnel longitudinally thereof for a substantial part of the length of said tunnel, generating products of combustion adjacent to said zone, re-circulating the products of combustion in said zone by energy, derived at least in part from the velocity of the gases introduced into said zone of the tunnel and in such manner and direction that the re-circulated gaseous media move toward the sides of the tunnel at a level below the path of the ware, thence up the sides of the tunnel, thence toward the center thereof above the path of the ware and thence downwardly through the path of the ware to the aforesaid level below the path of the ware to be re-circulated in the tunnel, and increasing the heating effect of said re-circulated gaseous media by adding thereto preheated air introduced into the upper part of the tunnel to move in the same direction as the moving gases to which said preheated air is added.

22. The method of treating glassware which comprises the steps of passing the ware to be treated through an elongate lehr tunnel having a heated section and a cooling section, generating products of combustion in the heated section of the lehr tunnel by introducing combustible media into the tunnel through burners located at places spaced longitudinally of the tunnel, causing a circulation of tunnel atmosphere and products of combustion in the heated section of the tunnel by the inductive action of said burners and the velocity of the products of combustion in such manner and direction that the products of combustion are directed toward the sides of the tunnel at a level below the path of the ware, thence upwardly, thence toward the center of the tunnel above the path of the ware and thence downwardly through the path of the ware, to be re-circulated and removing regulable amounts of said products of combustion and tunnel atmosphere from tunnel through a stack located adjacent to but spaced from the ware-entering end of said tunnel to cause a forward drift of said circulating and re-circulating gaseous media in said tunnel.

23. The method of treating glassware which comprises the steps passing the ware to be treated through an elongate lehr tunnel having a heated section and a cooling section, applying heat to the heated section of the lehr tunnel by introducing combustible media into the tunnel through burners located at places spaced longitudinally of the tunnel, causing a circulation of tunnel atmosphere and products of combustion in the heated section of the tunnel by the inductive action of said burners and the velocity of the products in such manner and direction that the products of combustion are directed toward the sides of the tunnel at a level below the path of the ware, thence upwardly to a level above the path of the ware, thence toward the center of the tunnel above the path of the ware and thence downwardly through the path of the ware, to be re-circulated, removing regulable amounts of said products of combustion and tunnel atmosphere from the tunnel through a stack located adjacent to but spaced from the ware-entering end of said tunnel to cause a forward drift of said circulating and re-circulating gaseous media in said tunnel, and aiding the circulation and re-circulation of the gaseous media in said heated section of the tunnel by applying to the gases in the upper portion of the tunnel above the path of the ware jets of air moving toward the longitudinally median line of the tunnel.

24. The method of decorating and re-annealing glassware which comprises passing said glassware through an elongate tunnel, introducing products of combustion at a plurality of places spaced longitudinally of a zone beginning at the ware-entering end of the tunnel and extending a substantial part of the length of said tunnel, in such manner as to cause, at least in part, by the energy of the products of combustion, generally transverse circulatory movements of the products of combustion and tunnel gases in said zone, removing part of said products of combustion and tunnel gases from said zone at a place adjacent to the ware-entering end of the tunnel to induce a forward drift of the circulating gaseous media in said zone, heating the ware in a succeeding zone of the tunnel by heat radiated from above and below the ware to bring the ware to a relatively high temperature adequate to effect fusing or maturing of the decoration on the ware, applying cooling air to the ware in the next zone of the tunnel to decrease the temperature of such ware to its upper annealing limit, and controlling the temperature in the remainder of said tunnel first to reduce the temperature of said ware uniformly and slowly from its upper annealing limit to its lower annealing limit and thereafter to accelerate the reduction of temperature of the ware.

25. The method of decorating and re-annealing glassware which comprises passing said glassware through an elongate tunnel, introducing products of combustion at a plurality of places spaced longitudinally of a zone beginning at the ware-entering end of the tunnel and extending a substantial part of the length of said tunnel, in such manner as to cause, at least in part, by the energy of the products of combustion, generally transverse circulatory movements of the products of combustion and tunnel gases in said zone, removing part of said products of combustion and tunnel gases from said zone at a place adjacent to the ware-entering end of the tunnel to induce a forward drift of the circulating gaseous media in said zone, heating the ware in a succeeding zone of the tunnel by heat radiated from above and below the ware to bring the ware to a relatively high temperature adequate to effect fusing or maturing of the decoration on the ware, applying cooling air to the ware in the next zone of the tunnel to decrease the temperature of such ware to its upper annealing limit, controlling the temperature in the remainder of said tunnel first to reduce the temperature of said ware uniformly and slowly from its upper annealing limit to its lower annealing limit and thereafter to accelerate the reduction of temperature of the ware, and removing at a place adjacent to and forwardly of the fusing and maturing zone the fumes resulting from the treatment of the ware in said zone.

26. The method of decorating and re-annealing glassware which comprises passing the decorated glassware through an elongate lehr tunnel, having successive preliminary heating, decoration fusing or maturing, rapid cooling, re-annealing and accelerated cooling zones, subjecting the ware in said preliminary heating zone to the action of heated products of combustion and tunnel gases caused to circulate in generally transverse directions in the lehr tunnel, removing part of the products of combustion and tunnel gases from said preliminary heating zone at a place adjacent to the ware-entering end thereof to cause a forward drift of the circulating gaseous media in said tunnel, heating the ware to a higher temperature in the fusing or maturing zone by subjecting the ware therein to radiant heat from heaters located both above and below the path of the ware, rapidly cooling the ware in the succeeding rapid cooling zone of the tunnel by causing cooling air to commingle and circulate with the tunnel gases in said zone in paths generally transverse thereof and passing close to and in contact with said ware, reducing the temperature of the ware more slowly in the re-annealing zone, and accelerating the cooling of the ware in the final zone of the tunnel by the introduction thereinto of cooling air.

27. The method of decorating and re-annealing glassware which comprises passing the decorated glassware through an elongate tunnel, heating the glassware in a zone commencing at the ware-entering end of the tunnel and extending for a substantial part of the length of the tunnel, further increasing the temperature of the ware in the succeeding zone of the tunnel by heating the ware therein both from above and below the path of the ware to bring the ware to the temperature required for the fusing or maturing of the decoration thereon, rapidly cooling the ware during its passage through a relatively short succeeding zone of the tunnel to reduce its temperature from the relatively high temperature required for the fusing or maturing of the decoration to the upper annealing limit of the ware, and thereafter controlling the temperature gradient of the ware during its passage through the remainder of the tunnel to gradually and uniformly reduce the temperature of the ware from its upper annealing limit to its lower annealing limit and subsequently to accelerate the cooling of the ware.

28. The method of decorating and re-annealing glassware which comprises pasing the decorated ware through an elongate tunnel having a high temperature zone spaced from both the front and rear ends of the tunnel, heating the ware during its passage through the portion of the tunnel in advance of said high temperature zone gradually to increase the temperature thereof, generating products of combustion in combustion chambers both above and below the path of travel of the ware through said high temperature zone, utilizing such products of combustion to heat radiant heaters located in said zone both above and below the path of travel of the ware and thereafter introducing said products of combustion into the tunnel at the forward end of said zone, and introducing cooling air under pressure into the tunnel at the rear of said high temperature zone to subject the ware passing therethrough to a relatively rapid localized cooling action.

29. A decorating lehr comprising an elongate tunnel, an open-work conveyor for transporting ware therethrough, said tunnel providing a preheating zone extending from the ware-entering end of the tunnel for a substantial part of the length thereof, means for heating the preheating zone including means beneath the conveyor for introducing and circulating gases of combustion in said tunnel, a stack located adjacent to the ware-entering end of the tunnel, a second stack adjacent to the rearward end of said preheating zone, a pair of dampers located side by side in each of said stacks, and shields for the portions of said stacks above said dampers for shielding said stacks from currents of air or wind at the exterior of said tunnel.

30. In a lehr, an elongate tunnel having a zone of relatively high temperature spaced from both the front and rear ends of the tunnel, and an air conducting tubular member extending in said tunnel past said zone of high temperature toward the front end of the tunnel, a portion of said air conducting tubular member having an imperforate heat-conductive wall located in position to be heated by heat from said zone of high temperature to preheat the air therein and another portion of said tubular member that is located in advance of said zone of relatively high temperature being provided with longitudinally spaced lateral orifices for introducing preheated air into the tunnel atmosphere.

31. In a lehr, an elongate tunnel having a zone of relatively high temperature spaced from both the front and rear ends of the tunnel, and a pair of air conducting pipes extending in the vicinity of the upper corner portions of said tunnel past said zone of high temperature, said pipes having orifices located in advance of said zone for discharging heated air into the tunnel toward the middle portion thereof.

DONALD G. MERRILL.